United States Patent [19]

Nohira

[11] 4,078,533

[45] Mar. 14, 1978

[54] INTERNAL COMBUSTION ENGINE HAVING AN AUXILIARY COMBUSTION CHAMBER

[75] Inventor: Hidetaka Nohira, Susono, Japan

[73] Assignee: Toyota Jidosha Kogyo Kabushiki Kaisha, Japan

[21] Appl. No.: 629,523

[22] Filed: Nov. 6, 1975

[30] Foreign Application Priority Data

Nov. 30, 1974  Japan .............................. 49-136620

[51] Int. Cl.² .............................................. F02B 19/10
[52] U.S. Cl. ........................... 123/148 DS; 123/191 S
[58] Field of Search .......... 123/148 DS, 32 MS, 8.09, 123/32 ST, 32 SP, 191 S, 191 SP, 148 C

[56] References Cited

U.S. PATENT DOCUMENTS

| | | | |
|---|---|---|---|
| 1,759,425 | 5/1930 | Suekoff | 123/32 SP X |
| 1,847,612 | 3/1932 | Horning | 123/191 S |
| 2,184,357 | 12/1939 | Mallory | 123/32 ST |
| 2,924,210 | 2/1960 | Summers | 123/32 SP X |
| 3,584,608 | 6/1971 | Shibagaki | 123/148 DS X |
| 3,704,591 | 12/1972 | Tatsutomi | 123/148 DS X |
| 3,752,128 | 8/1973 | Tatsutomi et al. | 123/148 DS X |
| 3,776,212 | 12/1973 | Karlowitz | 123/32 SP X |
| 3,945,365 | 3/1976 | Regueiro | 123/32 ST X |
| 3,957,020 | 5/1976 | Sasaki et al. | 123/148 DS X |

FOREIGN PATENT DOCUMENTS 612,150  1/1961  Canada ............................ 123/191 S

*Primary Examiner*—Charles J. Myhre
*Assistant Examiner*—Tony M. Argenbright
*Attorney, Agent, or Firm*—Stevens, Davis, Miller & Mosher

[57] ABSTRACT

An internal combustion engine having a main combustion chamber and an auxiliary combustion chamber having an opening in communication with the main combustion chamber is provided with a first spark plug in the auxiliary combustion chamber and a second spark plug in the main combustion chamber. The first and second spark plugs are used selectively to insure ignition in all operational ranges and all external conditions of the engine.

4 Claims, 4 Drawing Figures

INTERNAL COMBUSTION ENGINE HAVING AN AUXILIARY COMBUSTION CHAMBER

BACKGROUND OF THE INVENTION

The present invention relates to an internal combustion engine having a two-spark-plug type auxiliary combustion chamber, which is designed to perform selective ignition depending on the operating condition of the engine.

To burn a lean air-fuel mixture is one of the effective measures to decrease such toxic substances as hydrocarbon, carbon monoxide and nitrogen oxides that are usually present in the exhaust gases emanating from an internal combustion engine. Although that lean mixture is ignitable and combustible, it causes the flame produced to propagate slowly, thereby seriously decreasing the thermal efficiency of the engine cycle. The propagation velocity of the flame depends on the amount of the energy of its ignition source and the degree of turbulence in the air-fuel mixture burned. Namely, the greater the ignition energy, the greater will be the speed of the flame propagation. Hence, there has been already proposed a method to burn the lean mixture in the main combustion chamber with the flame projected from an auxiliary combustion chamber provided adjacent thereto.

There are several types of internal combustions engines that have such an auxiliary combustion chamber. In one of them, an intake valve, to draw in a comparatively richer air-fuel mixture, is provided in the auxiliary combustion chamber, in order to make the ignition therein easier. This type of internal combustion engine equipped with the auxiliary combustion chamber having such intake valve is reliable in terms of the ease and certainty with which the mixture is ignited. However, it tends to become complex in structure, since it has to contain in itself actuating mechanisms not only for the intake and exhaust valves in the main combustion chamber, but also for the intake valve to draw the richer mixture into the auxiliary combustion chamber. Also, an internal combustion engine that has no intake valve in its auxiliary combustion chamber has been proposed. In this latter type of engine, a lean air-fuel mixture is urged from the main combustion chamber into the auxiliary combustion chamber, during the compression stroke of the engine, so that it is ignited therein. This type of engine is disadvantageous because the exhaust gas of the preceding stroke that might be remaining in the auxiliary combustion chamber impedes the ignition of the fresh mixture therein. This disadvantage can however be easily overcome by providing some means that perfectly scavenges such residual gas out of the auxiliary combustion chamber so that the engine becomes very useful, is simple in structure, and reliable in operation.

In either type of the aforesaid internal combustion engines having an auxiliary combustion chamber, a spark plug is fitted in the auxiliary combustion chamber, so that the air-fuel mixture is ignited and burned therein. More particularly, the spark plug is provided at a suitable position in the auxiliary combustion chamber so that its electrodes are disposed, for instance, in the vicinity of the opening of the auxiliary combustion chamber through which it communicates with the main combustion chamber, thus making it possible to always supply a fresh mixture to the electrodes. This also helps to prevent the spark plug from becoming contaminated.

On the other hand, however, when the piston reciprocates rapidly during high-speed driving, the mixture in the main combustion chamber flows into the auxiliary chamber at such a great velocity that a violent turbulence is likely to occur in the latter. On such occasions, the nucleus of the flame formed around the electrodes of the spark plug is blown out before it grows to the size necessary for perfect ignition unless ignition timing is controlled very accurately. Also, when starting the engine at low temperature, the combustible air-fuel mixture does not readily condense in the vicinity of the spark plug's electrodes because the spark plug is located apart from the main combustion chamber.

This fact is responsible for the rather poor starting performance of this type of engine. In addition, the electrodes of the spark plug, being exposed to the strong projected flame, are liable to melt away, which in turn sometimes causes preignition.

SUMMARY OF THE INVENTION

The object of this invention is to provide an internal combustion engine equipped with an auxiliary combustion chamber of the type that prevents misfiring in the high-speed drive phase, overcomes the problem of poor ignition inherent during engine starting at low temperature, and improves all other defects described hereinabove.

The feature of this invention lies in that, in an internal combustion engine comprising a main combustion chamber and an auxiliary combustion chamber having an opening communicating with said main combustion chamber, a first spark plug is provided in the auxiliary combustion chamber and a second spark plug in the main combustion chamber so that they may be used selectively to insure ignition of the air-fuel mixture.

By the use of the second spark plug that is adapted to make up for the misfiring of the first spark plug in the high-speed operation range and its poor igniting performance in the low temperature range, this invention offers a highly reliable internal combustion engine that assures ignition of the air-fuel mixture in all operational ranges and under all external conditions.

BRIEF DESCRIPTION OF THE DRAWINGS

In order that this invention may be fully understood, it will now be described in detail with reference to the accompanying drawings, in which.

DETAILED DESCRIPTION OF THE PREFERRED EMBODIMENT

Figure 1:
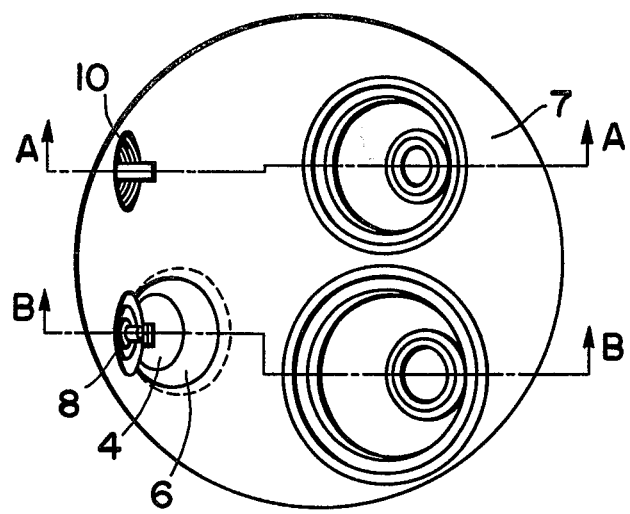
FIG. 1 is a plan view of the cylinder head side of the main combustion chamber of an internal combustion engine with an auxiliary combustion chamber according to this invention.
Figure 2:
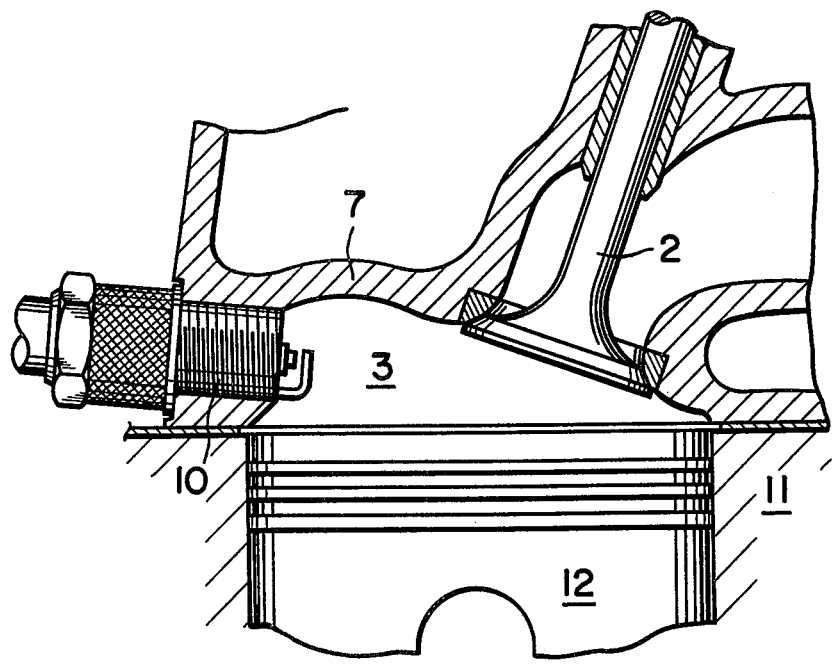
FIG. 2 is a cross-sectional view taken along the line A—A of FIG. 1.
Figure 3:
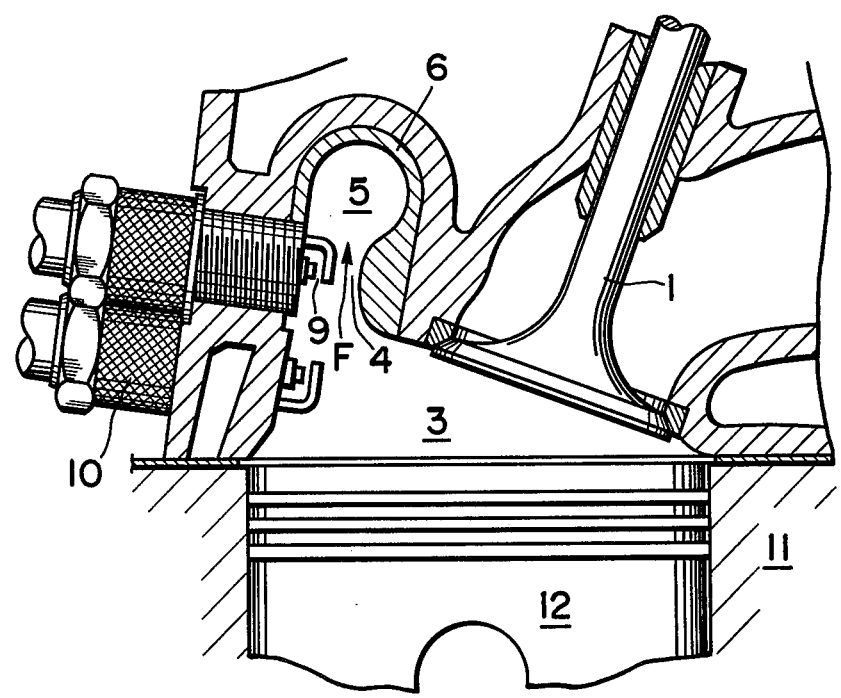
FIG. 3 is a cross-sectional view taken along the line B—B of FIG. 1.

Referring first to FIGS. 1, 2 and 3, an internal combustion engine having an auxiliary combustion chamber according to this invention comprises a main combustion chamber 3 which is provided with an intake valve 1 and an exhaust valve 2, and an auxiliary combustion chamber 5 is formed by an auxiliary combustion chamber shell 6 that is inserted in the cylinder head 7 by means of a press-fit or other suitable method. However, it should not be limited thereto, but the auxiliary combustion chamber for example, may be integrally formed within the cylinder head 7. In the auxiliary combustion chamber 5 is provided a first spark plug 8 preferably in such a position that its electrodes 9 will be disposed adjacent to or in the vicinity of the opening 4. A second spark plug 10 is provided in such a suitable position in the main combustion chamber 3 as, for instance, where the spark plug is usually provided in the ordinary internal combustion engine having no auxiliary combustion chamber.

When a piston 12 snugly fit in a cylinder 11 moves upward as it enters its compression stroke, a lean air-fuel mixture in the main combustion chamber 3 flows through the opening 4 into the auxiliary combustion chamber 5 as indicated by arrow F. This mixture flows in at such a great velocity when the reciprocating speed of the piston increases to attain high-speed operation of the engine that it gives rise to a violent turbulence in the auxiliary combustion chamber 5. This leads to misfiring since the nucleus of the flame, formed around the electrodes 9 of the spark plug 8, is blown out. On the other hand, in the starting of the engine at low temperature, the piston reciprocates slowly and, therefore, the mixture flows at low velocity. As a consequence, the mixture is not atomized to a sufficient degree. Furthermore, it becomes difficult for the mixture drawn in through the intake valve 1 to come in contact with the spark plug 8. All this is liable to result in ignition failure. According to this invention, however, such shortcomings of the first spark plug 8 are compensated for by the provision of the second spark plug 10 that is adapted to effect ignition in the above-mentioned problematic high-speed drive and low-temperature starting areas. More particularly, the second spark plug 10 is energized and effects ignition when the engine speed becomes as high as, for instance, 4,000 r.p.m., in order for the air-fuel mixture to be stably ignited and burned. Also, when starting the engine in such low-temperature region as between $-25°$ C and $0°$ C, the second spark plug 10 is energized and effects ignition of a fresh mixture so as to prevent the aforesaid ignition failure.

In the foregoing, selective use of the second spark plug 10 over the first spark plug 8 is accomplished when the engine is operated at high speed and when it is started at low temperature. But it is also possible to use the second spark plug 10 selectively during the warming-up and idling of the engine. Further, under any of the above conditions, namely, the high-speed drive, low-temperature starting, warming-up and idling conditions, both the first and second spark plugs 8 and 10 may both be used to effect ignition together, instead of switching from the former to the latter, by energizing the second spark plug 10 in advance of the first spark plug 8.

Figure 4:
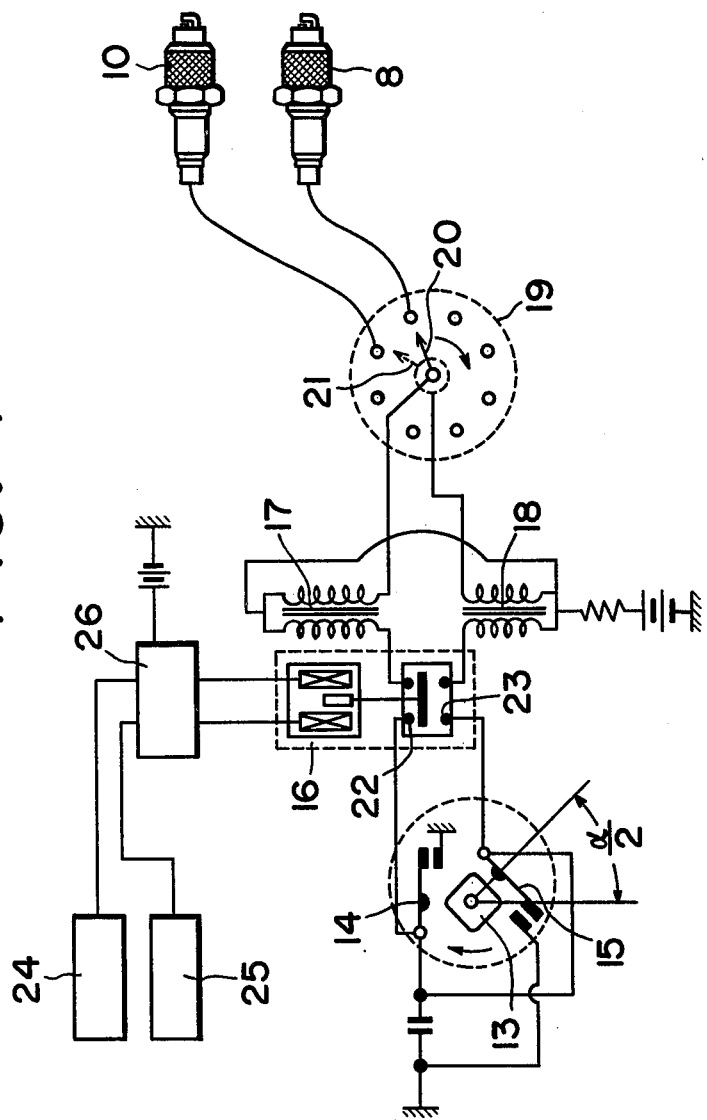
FIG. 4 is a schematic diagram showing the spark ignition system of the internal combustion engine of this invention that is equipped with the auxiliary combustion chamber.

Now an embodiment of an ignition control system to perform the switching between the first spark plug 8 and the second spark plug 10 will be described with reference to FIG. 4.

By the rotation of a cam rotor 13 fitted to a distributor 19, a first point 14 for the first spark plug 8 and a second point 15 for the second spark plug 10 are alternatively connected and disconnected. By the resultant switching of a point switch relay 16, either a first coil 17 connected to the first spark plug 8 or a second coil 18 to the second spark plug 10 becomes excited. Then, either the first spark plug 8 or the second spark plug 10 is energized through a first rotor 20 for the first spark plug 8 or a second rotor 21 for the second spark plug 10 on the distributor 19. The point switch relay 16 has a first contact 22 leading to the first spark plug 8 and a second contact 23 leading to the second spark plug 10, whose switching is performed by a controller 26 that issues the switching signals based on the comparative computation of signals sent from a thermo-sensor 24 detecting the temperature of the cooling water of the engine at the start of the engine and a detector 25 detecting the number of revolutions of the engine.

The operation of the above-described ignition control system will now be described. If the temperature is low when the engine is started, the signal sent from the thermo-sensor 24 is subjected to comparative computation in the controller 26, and the second contact 23 of the point switch relay 16 is connected. Consequently, the cam rotor 13 on the distributor 19 rotates so as to connect the second point 15, whereupon the high-voltage current from the second coil 18 is supplied through the second rotor 21 to the second spark plug 10. Then, as the engine comes to rotate at a speed greater than that specified for its starting stage, the controller 26 issues a switching signal on receiving the signal from the detector 25, so as to disconnect the second contact 23 of the point switch relay 16 and connect its first contact 22. As a result, the cam rotor 13 on the distributor 19 rotates so as to connect the first point 14, whereupon the high-voltage current from the first coil 17 is supplied through the first rotor 20 to the first spark plug 8. Further, when the engine speed reaches a predetermined level, for instance, 4,000 r.p.m., the controller 26 issues another signal on receiving the signal from the detector 25, so as to disconnect the first contact 22 of the point switch relay 16 and connect its second contact 23. Therefore, the cam rotor 13 on the distributor 19 rotates so as to connect the second point 15, whereupon the high-voltage current from the second coil 18 is supplied through the second rotor 21 to the second spark plug 10.

In the above-described embodiment, the point switch relay 16 is so controlled as to energize the second spark plug when the engine is started at low temperature and when it is operated at high speed. But this control may be designed to any other desirable modes, including warming-up and idling periods. Because the air-fuel mixture burns rather slowly when it is ignited by the second spark plug 10, it therefore is necessary to energize the second spark plug 10 earlier than the first spark plug 8. If the second point 15 is so arranged as to move ahead of the first point 14 by an angle of $\alpha/2$ degree, the second spark plug 10 will effect ignition and be energized earlier by the time corresponding to $\alpha$ degree.

As explained above, the internal combustion engine having the auxiliary combustion chamber according to this invention is highly reliable in operation, since it overcomes the difficulty in starting and prevents misfiring during high-speed operation which are usually experienced with the conventional internal combustion engine that has a single spark plug in its auxiliary combustion chamber. In addition, the engine of this invention is also advantageous with respect to emission control since its double ignition is employed only when the engine is started and when it is operated at high speed, each of which occurs relatively infrequently and, when they do occur, they last only for a rather short period of time.

What I claim is:

1. An internal combustion engine comprising:

means defining a main combustion chamber;

means defining an auxiliary combustion chamber having an opening through which the auxiliary combustion chamber directly opens into the periphery of the means defining the main combustion chamber, a first spark plug having an electrode adjacent the opening and in said auxiliary combustion chamber, a second spark plug having an electrode in said main combustion chamber, and means for selectively energizing said spark plugs to insure the ignition of air-fuel mixture in said chambers, said energizing means comprises an ignition control system that permits switching from said first spark plug to said second spark plug for starting the engine at low temperature, and for operating it at high speed.

2. An internal combustion engine as claimed in claim 1, wherein:

said ignition control system comprises a first rotor, a second rotor, a first point for said first spark plug, a second point for said second spark plug, a point relay switch selectively movable between a position in which said first point is electrically connected to said first spark plug through said first rotor and a position in which said second point is electrically connected to said second spark plug through said second rotor.

3. An internal combustion engine comprising:

means defining a main combustion chamber, means defining an auxiliary combustion chamber having an opening through which the chambers fuidly communicate, said auxiliary combustion chamber being completely closed except for said opening and having no intake valve, a first spark plug having an electrode adjacent the opening and in said auxiliary combustion chamber, a second spark plug having an electrode in said main combustion chamber, and means for selectively energizing said spark plugs to insure the ignition of air-fuel mixture in said chambers, said energizing means comprises an ignition control system that permits switching from said first spark plug to said second spark plug for starting the engine at low temperature, and for operating it at high speed.

4. An internal combustion engine as claimed in claim 3, wherein:

said ignition control system comprises a first rotor, a second rotor, a first point for said first spark plug, a second point for said second spark plug, a point relay switch selectively movable between a position in which said first point is electrically connected to said first spark plug through said first rotor and a position in which said second point is electrically connected to said second spark plug through said second rotor.

* * * * *